United States Patent
Jensen et al.

(10) Patent No.: US 11,780,588 B2
(45) Date of Patent: Oct. 10, 2023

(54) AIRCRAFT PASSENGER SEAT AND SEAT ROW

(71) Applicant: ZIM AIRCRAFT SEATING GMBH, Immenstaad am Bodensee (DE)

(72) Inventors: Alexander Jensen, Friedrichshafen (DE); Marc Dittrich, Amtzell (DE)

(73) Assignee: ZIM Aircraft Seating GmbH, Immenstaad am Bodensee (DE)

( * ) Notice: Subject to any disclaimer, the term of this patent is extended or adjusted under 35 U.S.C. 154(b) by 0 days.

(21) Appl. No.: 17/821,899

(22) Filed: Aug. 24, 2022

(65) Prior Publication Data
US 2022/0402613 A1 Dec. 22, 2022

Related U.S. Application Data

(63) Continuation of application No. PCT/EP2021/055457, filed on Mar. 4, 2021.

(30) Foreign Application Priority Data

Mar. 5, 2020 (DE) ............ 10 2020 106 029.7

(51) Int. Cl.
*B64D 11/06* (2006.01)
(52) U.S. Cl.
CPC ................. *B64D 11/0638* (2014.12)
(58) Field of Classification Search
CPC ..... B64D 11/0638; B60N 3/004; A47C 7/624; A47C 7/70
USPC ................. 297/145, 146, 142, 135
See application file for complete search history.

(56) References Cited

U.S. PATENT DOCUMENTS

| 5,683,136 A * | 11/1997 | Baumann ............... A47C 7/70 297/162 |
| 5,765,911 A * | 6/1998 | Sorenson ............... A47C 7/70 297/161 |
| 6,220,658 B1 * | 4/2001 | Lukawski ............... A47C 7/70 297/145 |

(Continued)

FOREIGN PATENT DOCUMENTS

| CN | 104417756 A | 3/2015 |
| CN | 106255831 A | 12/2016 |

(Continued)

OTHER PUBLICATIONS

German Search Report (Application No. 10 2020 106 029.7) dated Feb. 16, 2021.

(Continued)

*Primary Examiner* — Jose V Chen
(74) *Attorney, Agent, or Firm* — BURR PATENT LAW, PLLC

(57) ABSTRACT

An aircraft-passenger seat is provided, including a structural component on which a table top of the aircraft-passenger seat is mounted via an articulation arrangement such that the table top can be pivoted about a pivot axis of the articulation arrangement, from an upright position, in which the table top is up against the structural component, to a use position, in which the table top projects outwardly from the structural component, and back out of the use position into the upright position. The articulation arrangement includes a damping device that damps the pivoting movement of the table top between the upright position and the use position.

13 Claims, 4 Drawing Sheets

(56) References Cited

U.S. PATENT DOCUMENTS

| | | | | |
|---|---|---|---|---|
| 6,601,523 | B2* | 8/2003 | Jensen | B64D 11/0638 297/146 |
| 6,761,398 | B2* | 7/2004 | Bentley | B61D 33/0007 297/165 |
| 7,004,430 | B2* | 2/2006 | Weekly | B60N 3/004 16/248 |
| 7,500,716 | B2* | 3/2009 | Guerin | B64D 11/00153 725/77 |
| 8,905,470 | B2* | 12/2014 | Shih | B60N 3/004 297/146 |
| 8,997,660 | B2* | 4/2015 | Satterfield | A47B 13/081 108/73 |
| 10,172,467 | B1* | 1/2019 | Shih | A47C 7/70 |
| 2006/0220425 | A1* | 10/2006 | Becker | A47C 7/70 297/188.16 |
| 2007/0132283 | A1* | 6/2007 | Mitjans | A47C 7/70 297/145 |
| 2008/0073946 | A1* | 3/2008 | Maione | A47C 7/705 297/161 |
| 2010/0171350 | A1* | 7/2010 | Large | B64D 11/00153 297/217.3 |
| 2010/0326331 | A1* | 12/2010 | St. Louis | B64D 11/00 108/44 |
| 2014/0110977 | A1* | 4/2014 | Madrigal | A47C 7/705 297/173 |
| 2014/0300148 | A1* | 10/2014 | Frost | B64D 11/0638 297/173 |
| 2015/0061328 | A1 | 3/2015 | Kalsberger et al. | |
| 2015/0167288 | A1* | 6/2015 | Harkin | B64C 3/40 403/107 |
| 2015/0267757 | A1 | 9/2015 | Garing et al. | |
| 2016/0167555 | A1* | 6/2016 | Allen | B60N 3/004 108/134 |
| 2016/0355263 | A1 | 12/2016 | Pozzi et al. | |
| 2017/0009804 | A1* | 1/2017 | Garing | B60N 3/004 |
| 2018/0281966 | A1 | 10/2018 | Chuang et al. | |
| 2020/0017220 | A1 | 1/2020 | Wanner et al. | |
| 2021/0007494 | A1* | 1/2021 | Dusek | A61G 5/125 |
| 2022/0127002 | A1 | 4/2022 | Bendele et al. | |
| 2022/0380055 | A1* | 12/2022 | Jensen | B60N 3/004 |

FOREIGN PATENT DOCUMENTS

| | | |
|---|---|---|
| CN | 110697050 A | 1/2020 |
| DE | 10 2019 103 813 A1 | 8/2020 |
| EP | 3 594 067 A1 | 1/2020 |
| FR | 2 999 394 A1 | 6/2014 |
| WO | 2012/118096 A1 | 9/2012 |
| WO | 2017/147620 A1 | 8/2017 |

OTHER PUBLICATIONS

International Search Report and Written Opinion (Application No. PCT/EP2021/055457) dated Jun. 7, 2021.

International Preliminary Report on Patentability (with Chapter II Claims) Application No. PCT/EP2020/055457) dated Jan. 21, 2022 (with English translation).

Chinese Office Action (with English translation) dated Dec. 5, 2022 (Application No. 202180017930.6).

* cited by examiner

AIRCRAFT PASSENGER SEAT AND SEAT ROW

CROSS REFERENCE TO RELATED APPLICATIONS

This application is a continuation of International Application No. PCT/EP2021/055457 filed Mar. 4, 2021, which designated the United States, and claims the benefit under 35 USC § 119(a)-(d) of German Application No. 10 2020 106 029.7 filed Mar. 5, 2020, the entireties of which are incorporated herein by reference.

FIELD OF THE INVENTION

The present invention relates to an aircraft passenger seat and seat row.

BACKGROUND OF THE INVENTION

A large number of configurations of aircraft-passenger seat in a number of seat rows, usually each comprising a number of aircraft-passenger seats, are known for equipping the interior of cabins of passenger aircraft. It is usually the case that, for each seat row, two or more aircraft-passenger seats are set up in an aligned manner one beside the other in the aircraft. In order for seating to be comfortable, a seat unit formed by the aircraft-passenger seat is provided with upholstery including seat-bottom upholstery and backrest upholstery. Moreover, adjustable additional functions, such as a swing-action table top, are realized on the aircraft-passenger seat.

The design of an aircraft-passenger seat should ensure that ease of use and operation is provided in a very restricted amount of space.

SUMMARY OF THE INVENTION

The object of the present invention is to provide an improved aircraft-passenger seat which is advantageous, in particular, in respect of ease of use and operation.

The present invention is based on an aircraft-passenger seat comprising a structural component on which a table top of the aircraft-passenger seat is mounted via an articulation arrangement such that it can be pivoted about a pivot axis of the articulation arrangement, so that the table top can be pivoted from an upright position of the table top, in which the latter has been swung up against the structural component, from a use position of the table top, in which the latter projects from the structural component, and back out of the use position into the upright position.

In the state in which the aircraft-passenger seat has been installed in an aircraft cabin, the structural component, for example, or preferably a rear enclosure belonging to the aircraft-passenger seat or a seat row, is an upright seat component which is present on the floor surface, preferably in a fixed or immovable or stationary manner, in the passenger cabin or in the aircraft cabin of the passenger aircraft. The structural component, which is, for example, shell-like and/or preferably has surface-area portions, preferably extends behind a backrest of the aircraft-passenger seat, as seen in relation to a seating direction of the aircraft-passenger seat, and covers this backrest to the rear/laterally and, possibly, above. Accordingly, a structural-component rear side, on which the table top is preferably mounted, for example, in a recessed region of the structural component, is directed towards the seat row behind and/or the aircraft-passenger seats thereof. The table top can, therefore, be used by a person who is sitting in an aircraft-passenger seat which, being located behind the aircraft-passenger seat according to the present invention, belongs to a seat row behind.

The core of the present invention is that the articulation arrangement comprises a damping device, which is designed to damp the pivoting movement of the table top between the upright position of the table top and the use position of the table top. The damping device serves to damp or to brake the pivoting or swinging-down movement of the table top. The damping device is designed, for example, in the form of a frictional damper with a frictional element and/or in the form of a braking device or in the form of a rotational damper.

This increases the ease of use of the aircraft-passenger seat for a passenger who is using the table top. The situation where the table top strikes in an undesirable manner against a stop of the articulation arrangement as it reaches the use position is avoided.

The damping device provides for damping of the pivoting movement preferably at least over part of the pivoting movement from the swung-up, upright position of the table top into the horizontally oriented, use position. The swung-up, upright position of the table top means a position in which the table top is recessed within the structural component, and/or has been pivoted up without any contours proving problematic, and is secured. The table top here does not jut out into a free use space which is located behind the structural component and is present between two seat rows. The swung-up table top is preferably in a recessed state flush in relation to a rear side of the structural component or is located in a depression which is at a lower level than the adjacent region of the rear side of the structural component. The depth of the depression preferably corresponds approximately to a thickness dimension of the table top.

The articulation arrangement is present and active between the table top and the structural component, for example, in the form of an articulation arrangement or in the form of a fitting with, for example, two identically acting fitting parts for pivoting through approximately 90 degrees about a horizontal. The table top of the aircraft-passenger seat can be used on the rear side of the structural component, in its swung-down, in particular, horizontally oriented position, by a person who is sitting behind the aircraft-passenger seat, in a further aircraft-passenger seat. A fitting preferably has two articulation parts which can be rotated relative to one another or are connected to one another in a rotatable manner.

The structural component has, for example, horizontally spaced-apart and vertically oriented edge portions located opposite one another and also, provided therebetween, a vertical flat portion, within which the table top can be recessed in a depression by being swung up against it. This results in the table top being positioned in a state in which it has been swung up to an upright or, for example, vertically oriented or slightly inclined position above the articulation arrangement.

The table top is provided on the structural component such that, once a securing function or a retaining mechanism for retaining the swung-up table top has been disengaged, it can be swung down from the upright, not-in-use position into the rearwardly projecting, use position by way of the articulation arrangement.

The damping device is preferably coordinated with the overall weight of the table top, so that the latter can be pivoted into the use position in a controlled and/or uniform and damped manner.

The damping device is preferably active only when it is being swung down from the upright position into the use position, but not, or only to an insignificant extent, when it is being swung up from the use position back into the upright position, for example, with freewheeling.

It is advantageous if, in the state in which the table top has been installed on the aircraft-passenger seat, the damping device is accommodated in an interior region of the articulation arrangement, this interior region being partitioned off from the outside, such that the damping device on the articulation arrangement cannot be seen from the outside.

This is advantageous, for example, for visual reasons. The articulation arrangement is preferably concealed by an outer side, or by outer portions, of the articulation arrangement and therefore cannot be seen. Concealment is advantageously provided in all pivoting positions of the table top.

It is also advantageous that the damping device is coordinated such that the damping of the pivoting movement of the table top takes place over a partial pivoting range of a possible overall pivoting range of the pivoting movement of the table top, wherein the overall pivoting range covers the pivoting range over which the table top pivots from the upright position into the use position. The damping device is preferably designed such that following a first, undamped pivoting range during the course of the table top pivoting downward from the upright position into the use position, wherein the undamped pivoting range corresponds approximately to a pivoting range of 45 degrees, the damping or braking action starts up or begins and continues until the end of the pivoting movement, when the use position of the table top is reached.

The arrangement according to the present invention shortens the overall duration of the partially undamped and partially damped pivoting movement from the swung-up, upright position into the use position of the table top to an acceptable or minimal period of time.

The damping device is advantageously coordinated such that the damping device is coordinated such that the damping of the pivoting movement of the table top takes place over a partial pivoting range of the pivoting movement of the table top, wherein the damped partial pivoting range concerns the pivoting movement of the table top prior to the use position of the table top being reached.

It is preferably the case, during the course of the table top being swung downward, for the table top to be damped by the damping device over a final or lower partial pivoting range, prior to reaching the resting, use position in the for example, horizontal. The damping or braking of the table top prior to it reaching the use position ensures that the articulation arrangement is subjected only to brief mechanical loading by a stop when the end or use position is reached. This increases the service life of the articulation arrangement and/or prevents damage to the articulation arrangement. Moreover, impact noise is avoided.

Moreover, it is advantageous that the damping device is coordinated such that the damping of the pivoting movement of the table top takes place over a partial pivoting range of the pivoting movement of the table top, wherein the partial pivoting range covers a pivoting range which is at least 50% of the overall pivoting range of the pivoting movement of the table top and over which the table top pivots from the upright position of the table top into the use position of the table top. A pivoting speed of the table top is, therefore, limited to an acceptable extent.

The damped partial pivoting range is preferably at least 40%, preferably at least 30%, preferably at least 20%, of the overall pivoting range of the pivoting movement of the table top between the upright position and the use position of the table top.

According to a modification of the present invention, it is an advantage that the damping device is coordinated such that the damping of the pivoting movement of the table top takes place over a partial pivoting range of a possible overall pivoting range of the pivoting movement of the table top, wherein the overall pivoting range covers the pivoting range over which the table top pivots from the upright position into the use position, wherein the damped partial pivoting range the movement of the table top is at least 30 degrees, preferably at least 40 degrees, preferably at least 50 degrees, of the pivoting movement of the table top.

It is, therefore, possible specifically to predefine a partial pivoting range which is damped, in contrast to a pivoting range of the table top which is undamped and can therefore be covered more quickly. The damped pivoting range is preferably the pivoting range which comes prior to the use position being reached as the table top is being swung down from the upright position.

The table top is advantageously connected to a sidepiece of the structural component by the articulation arrangement, preferably is articulated on opposite sidepieces of the structural component by two articulation arrangements. The two sidepieces, located opposite one another, on the aircraft-passenger seat form rearwardly projecting, horizontally spaced-apart and separate portions which are located opposite one another on the structural part like the enclosure. The sidepieces bound, for example, the depression on the rear side of the aircraft-passenger seat, in which the swung-up table top is accommodated in a recessed state in the upright position.

According to an advantageous modification, in the region of the pivot axis, the articulation arrangement comprises a first articulation part and a second articulation part, which are connected to one another such that they can be rotated relative to one another, wherein the first articulation part is connected to the table top and the second articulation part is connected to the structural component, wherein a bearing pin on one articulation part engages in a bearing mount on the other articulation part, the bearing mount being coordinated with the bearing pin.

This provides for a compact and stable articulation arrangement. In addition, the articulation arrangement is straightforward to produce and uncomplicated to assemble. The bearing pin and the bearing mount preferably form frictional partners of a damping device configured in the form of a frictional damping device.

It is advantageous that the damping device has a frictional-damper member which is present between a first articulation part of the articulation arrangement and a second articulation part of the articulation arrangement, wherein the frictional-damper member provides for friction during relative movement between the first articulation part and the second articulation part.

This is advantageous as far as a straightforward and reliable damper device is concerned. The frictional-damper member advantageously comprises, for example, an elastic friction member made of, for example, an elastomeric or rubber material.

Moreover, it is possible for a frictional-damper member to be changed over straightforwardly and quickly.

As an alternative, it is possible for the frictional-damper member to be, for example, integral with one articulation part or both articulation parts.

The damping device advantageously comprises a fluid-dynamic damper. This can advantageously provide for reliable and uniformly acting damping.

The fluid-dynamic damper is preferably a fluid damper, e.g. a viscous, oil or air damper, for example, in the form of a viscous or oil damper or of a gas pressure spring.

It is also advantageous that the damping device has an adjustment mechanism for adjusting the damping action which can be provided by the damping device. The damping action can, therefore, be adapted to different damping characteristics and/or to respectively different sizes of masses which are to be damped. The adjustment mechanism can be used, for example, for adaptation to a mass which the damping device actually acts on or to different weights of table tops, which, depending on the table-top material, differ from one another in terms of mass. In the event of the table top having a comparatively higher mass, the damping action can be correspondingly increased in relation to an adjustment for damping the pivoting movement for a lower table-top mass.

It is advantageous if the table top has an additional panel connected to it in an articulated manner, wherein the additional panel is mounted in an articulated manner on the table top, wherein there is a further damping device provided for the damping of the pivoting movement of the additional panel relative to the table top. The additional panel can be used, in a space-saving manner, to increase the surface area of the overall usable surface area of the table, comprising the table top and the additional panel, by way of the further, or second, panel or additional panel. Accordingly, the additional panel is pivoted through 180 degrees from a position in which it rests on the table top, parallel thereto, into a position in which it is aligned with the table top. As far as the additional panel, which is connected to the table top in an articulated manner, is concerned, the further damping device can also advantageously damp the pivoting movement of the additional panel relative to the table top.

The present invention advantageously extends to a seat row comprising a number of aircraft-passenger seats according to one of the above-described configurations which are present one beside the other. The advantages discussed can, therefore, be achieved for a seat row comprising the aircraft-passenger seats. It is usually the case that each individual aircraft-passenger seat has, at the rear, a table top for a person who is sitting behind the relevant aircraft-passenger seat, in a further aircraft-passenger seat in the seat row behind.

BRIEF DESCRIPTION OF THE DRAWINGS

Further features and advantages of the present invention will be explained in more detail hereinbelow with reference to a schematically illustrated exemplary embodiment.

DETAILED DESCRIPTION OF THE INVENTION

Figure 1:
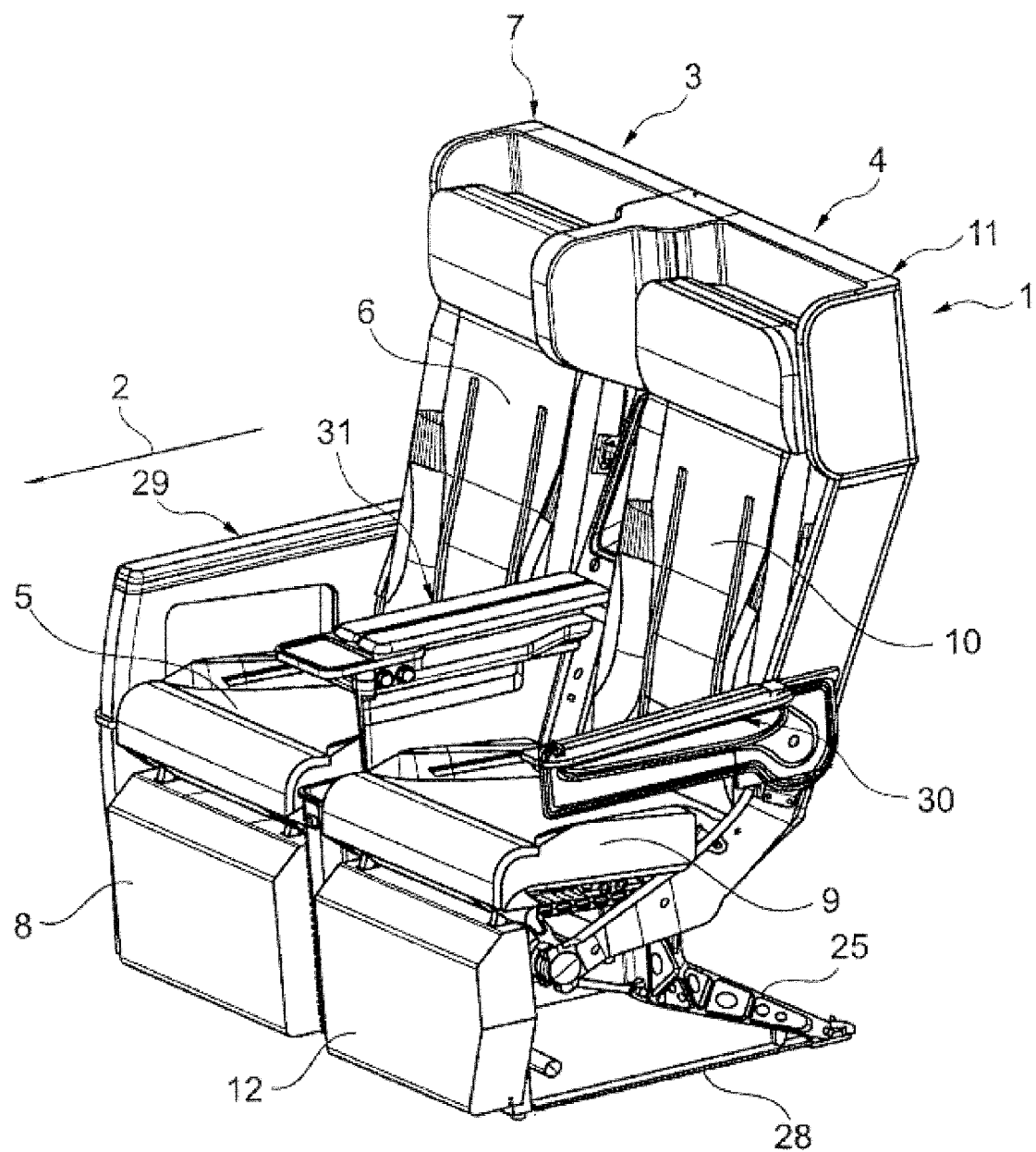
FIG. 1 shows a perspective view, as seen obliquely from the front, of a seat row having two aircraft-passenger seats each comprising a seat bottom, a backrest, including a structural component at the rear, and also a legrest.

FIG. 1 shows a seat row 1 with a seating direction 2 and having two aircraft-passenger seats 3 and 4. Any information given hereinbelow in relation to position and direction, such as front, rear, up and down, relates to the seating direction 2 and the use state of the seat row 1.

The two aircraft-passenger seats 3 and 4 are constructed in a corresponding manner. The aircraft-passenger seat 3 has a seat bottom 5, a backrest 6 and a structural component 7, which is at the rear of the backrest 6 and is designed, for example, in the form of an enclosure. A front end region of the seat bottom 5 is followed by a preferably swing-action legrest 8, which can be swung about a horizontal axis.

Accordingly, the aircraft-passenger seat 4 comprises a seat bottom 9, a backrest 10, a structural component 11, or an enclosure, and a legrest 12.

The seat bottoms 5, 9, the backrests 6, 10 and the legrests 8, 12 comprise preferably ergonomically formed upholstery.

The aircraft-passenger seats 3 and 4 can be installed on a floor of a cabin of an associated aircraft via two supporting legs 13 and 14.

For this purpose, the supporting leg 13 has one installation location 17 at a lower end region 16 of a front strut 15 and a further installation location 20 at a lower end region 19 of a rear strut 18. A strut-arrangement element 21 is provided between the end regions 16 and 19.

The supporting leg 14 has one installation location 24 at a lower end region 23 of a front strut 22 and a further installation location 27 at a lower end region 26 of a rear strut 25. A strut-arrangement element 28 is provided between the end regions 23 and 26.

The seat row 1 also has an outer armrest 29 to the side of the aircraft-passenger seat 3 and an outer armrest 30 to the side of the aircraft-passenger seat 4. The two aircraft-passenger seats 3 and 4 have arranged between them, preferably at the level of the two outer armrests 29, 30, a console 31, which a passenger can likewise use as an armrest.

The structural components 7 and 11 are provided with further elements, e.g. they are each provided with additional functions at the rear. An upper rear region of the structural components 7, 11 is provided, for example, with a respective multimedia unit 32 for digital media, for example, with an electronic input and output device or with a touchscreen.

For example, a respective swing-action table top 33 for the respective aircraft-passenger seat 3 and 4, such as a tray table, is formed in a central region or a region which follows beneath the multimedia unit 32.

Figure 2:
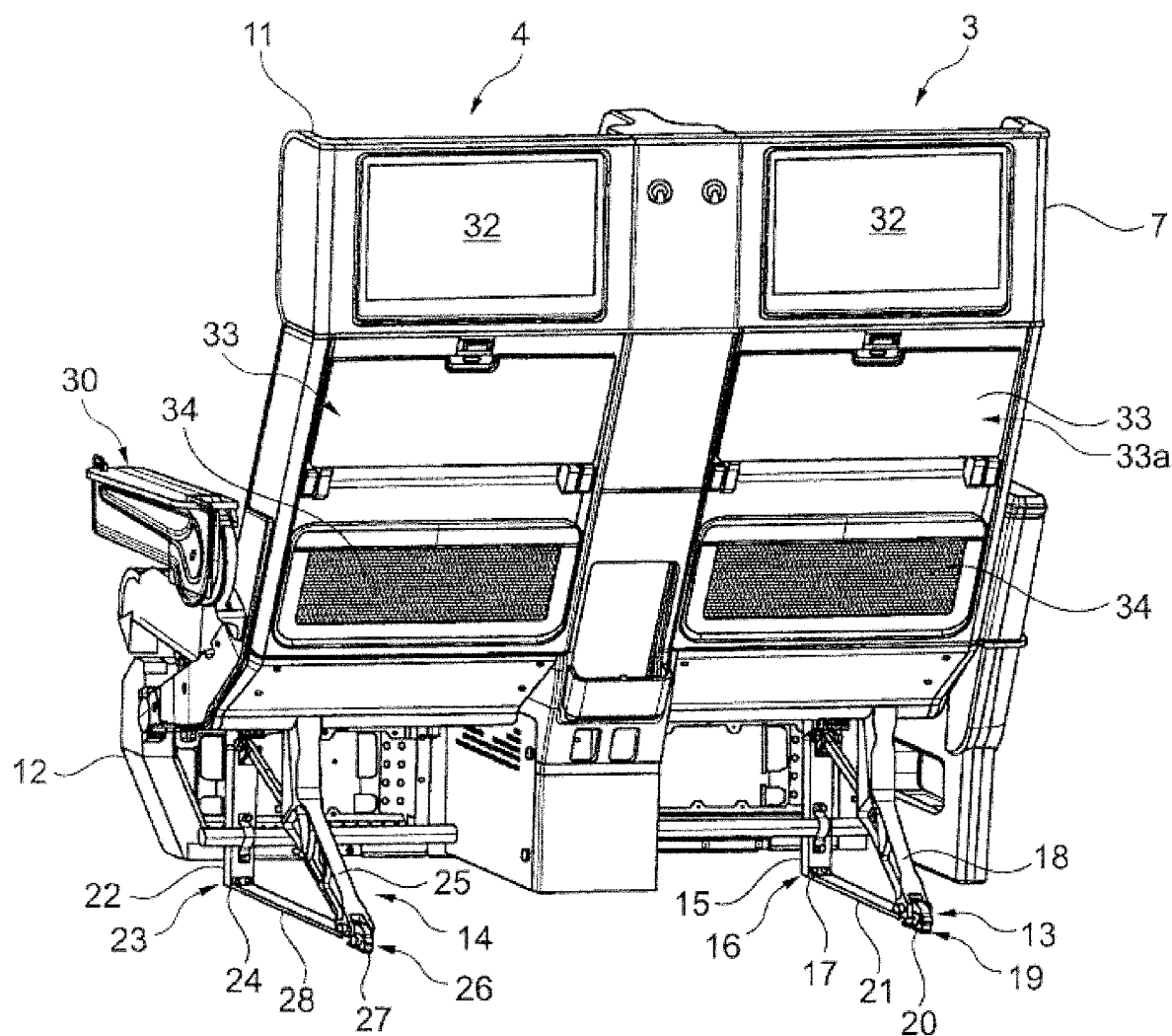
FIG. 2 shows a perspective view, as seen obliquely from the rear, of the seat row according to FIG. 1.

In FIG. 2, the table tops 33 are illustrated in a swung-up, vertically oriented and secured, not-in-use position or upright position.

A stowage compartment 34, for example, for accommodating magazines or brochures or other items is present beneath the respective swing-action table top 33.

The table top 33 will be explained in more detail hereinbelow with reference to the aircraft-passenger seat 3, wherein the table top 33 on the aircraft-passenger seat 4 is of identical construction.

The table top 33, which has an exterior surface covering 33a such as, for example, a thin cover element, comprises two panel components, which are connected in an articulated manner and include a first panel component 35 and a second panel component 36, which is in the form of an additional panel. An articulation arrangement 37, which comprises one fitting 38 and a further fitting 39, is provided in order to arrange the table top 33 for swing action on the structural component 7 and/or on opposite sidepieces 45. The articulation arrangement 37 acts between the panel component 35 and the structural component 7.

Figure 3:
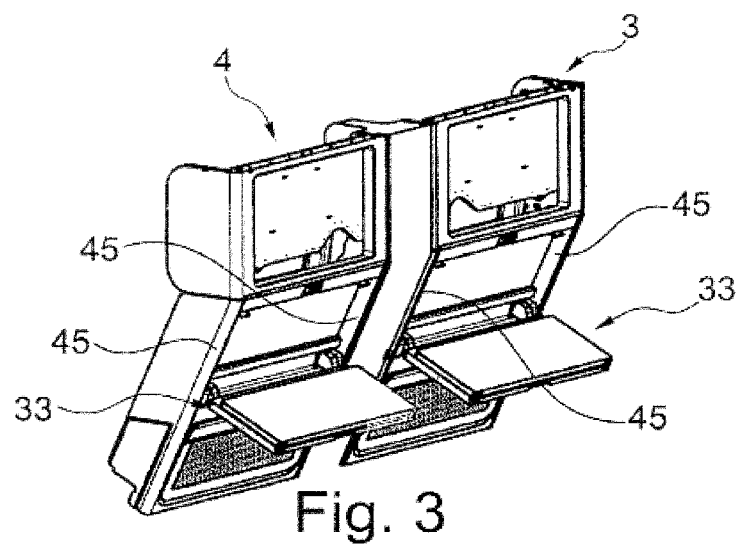
FIG. 3 shows a detail of a seat row having two aircraft-passenger seats, as seen from behind according to FIG. 2, with two table tops in the use position.

FIG. 3 illustrates the table tops 33 with the respective additional panel, or the panel component 36, in a use position, swung down in relation to FIG. 2. The panel component 36 is present in a state in which it has been swung above the panel component 35 and rests thereon.

Figure 4:
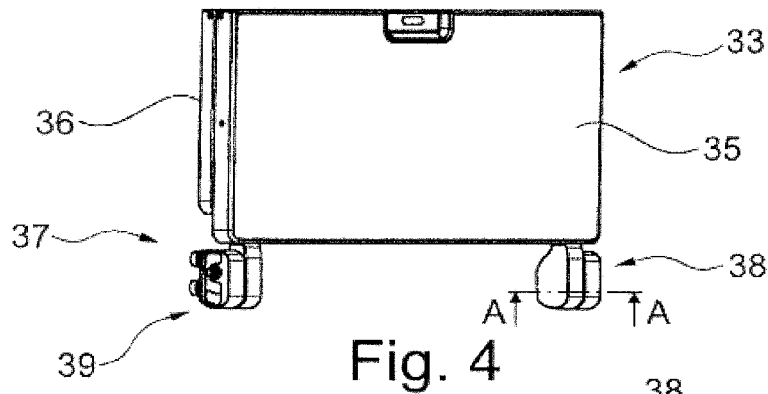
FIG. 4 shows an illustration solely of the table tops according to FIG. 3 in an upright position along with an articulation arrangement, and comprising an additional panel.
Figure 5:
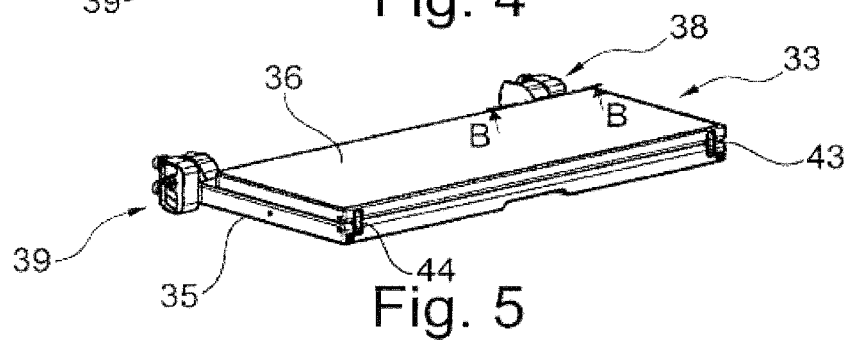
FIG. 5 shows the arrangement according to FIG. 4 in a use position of the table top.
Figure 6:
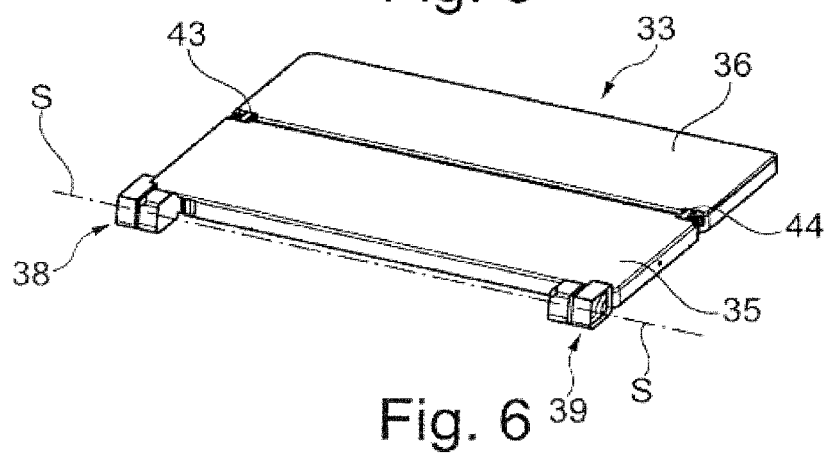
FIG. 6 shows a perspective view of the table top according to FIG. 5 in a swung-open position of the additional panel.

FIG. 4 is an illustration solely of the table top 33 with the articulation arrangement 37, or the fittings 38 and 39. FIG. 4 shows the upright position of the table top 33 with the panel components 35 and 36 resting in surface contact against one another. The panel component 35 here is present on the structural component 7 in a state in which it has been articulated thereon via the articulation arrangement 37.

The articulation arrangement 37 comprises a damping device 40. The damping device 40 is preferably provided in precisely one of the two fittings 38 or 39 or is integrated in both fittings 38 and 39.

Figure 7:
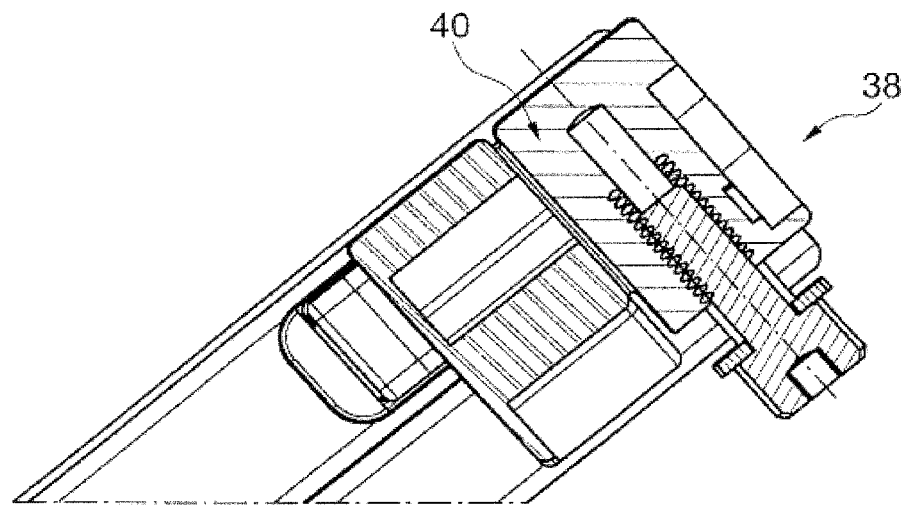
FIG. 7 shows the sectional illustration taken along line A-A in FIG. 4.
Figure 8:
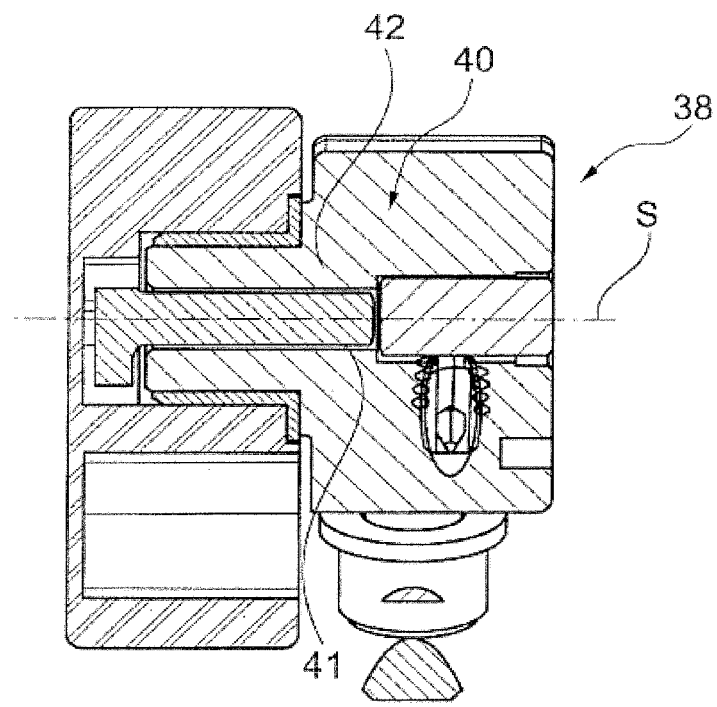
FIG. 8 shows the sectional illustration taken along line B-B in FIG. 5.

The damping device 40 will be explained with reference to the fitting 38, using the sectional views according to FIGS. 7 and 8.

A friction element 41 and a damping element 42, which interacts with the friction element 41, are present along an axis of rotation S of a table top, and these elements, when the table top 33 or the panel component 35 rotates about the axis of rotation S of the table top, end up resting against one another with frictional contact, and this results in the pivoting movement of the table top 33 or of the panel component 35 being damped. The damping or braking action preferably begins once the panel component 35 has been pivoted through approximately 45 degrees from the upright position. This corresponds to a first, undamped pivoting range and a subsequent or second, damped pivoting range of approximately 50%, for an overall pivoting range of the table top 33 or of the panel component 35 of approximately 90 degrees.

The panel component 36 is connected to the panel component 35 in an articulated manner via further articulations 43 and 44. It is preferably the case that a respective damping device is provided in the two articulations 43 and 44 for the purpose of damping the pivoting movement of the panel component 36 in relation to the panel component 35.

LIST OF REFERENCE SIGNS

1 Seat row
2 Seating direction
3 Aircraft-passenger seat
4 Aircraft-passenger seat
5 Seat bottom
6 Backrest
7 Structural component
8 Legrest
9 Seat bottom
10 Backrest
11 Structural component
12 Legrest
13 Supporting leg
14 Supporting leg
15 Strut
16 End region
17 Installation location
18 Strut
19 End region
20 Installation location
21 Strut-arrangement element
22 Strut
23 End region
24 Installation location
25 Strut
26 End region
27 Installation location
28 Strut-arrangement element
20 Armrest
30 Armrest
31 Console
32 Multimedia unit
33 Table top
33a Covering
34 Stowage compartment
35 Panel component
36 Panel component
37 Articulation arrangement
38 Fitting
39 Fitting
40 Damping device
41 Friction element
42 Damping element
43 Articulation
44 Articulation
45 Sidepiece

The invention claimed is:

1. An aircraft-passenger seat comprising:
a table top; and
a structural component on which the table top is mounted via an articulation arrangement, such that the table top can be pivoted about a pivot axis of the articulation arrangement, whereby the table top can be pivoted from an upright position, in which table top is up against the structural component, to a use position, in which the table top projects outwardly from the structural component, and back out of the use position into the upright position,
wherein the articulation arrangement comprises a damping device, that damps a pivoting movement of the table top between the upright position and the use position,
wherein the damping device is coordinated such that the damping of the pivoting movement of the table top takes place over a partial pivoting range of a possible overall pivoting range of the pivoting movement of the table top,
wherein the overall pivoting range covers the pivoting range over which the table top pivots from the upright position into the use position,
wherein a damped partial pivoting range relates to the pivoting movement of the table top before the use position is reached, and wherein the partial pivoting range covers a pivoting range that is at least 50% of the overall pivoting range of the pivoting movement of the table top and over which the table top pivots from the upright position into the use position.

2. The aircraft-passenger seat as claimed in claim 1, wherein, in the state in which the table top has been installed on the aircraft-passenger seat, the damping device is accommodated in an interior region of the articulation arrangement, and
wherein the interior region is partitioned off from the outside, such that the damping device on the articulation arrangement cannot be seen from the outside.

3. The aircraft-passenger seat as claimed in claim 1, wherein the damped partial pivoting range of the pivoting movement of the table top is at least 30 degrees.

4. The aircraft-passenger seat as claimed in claim 3, wherein the damped partial pivoting range of the movement of the table top is at least 40 degrees of the pivoting movement of the table top.

5. The aircraft-passenger seat as claimed in claim 3, wherein the damped partial pivoting range of the movement of the table top is at least 50 degrees of the pivoting movement of the table top.

6. The aircraft-passenger seat as claimed in claim 1, wherein the table top is connected to a sidepiece of the structural component by the articulation arrangement.

7. the aircraft-passenger seat as claimed in claim 6, wherein the table top is articulated on opposite sidepieces of the structural component by two fittings of the articulation arrangement.

8. The aircraft-passenger seat as claimed in claim 1, wherein, in a region of the pivot axis, the articulation arrangement comprises a first articulation part and a second articulation part, which are connected to one another such that they can be rotated relative to one another,
wherein the first articulation part is connected to the table top and the second articulation part is connected to the structural component, and
wherein a bearing pin on one articulation part engages in a bearing mount on the other articulation part, the bearing mount being coordinated with the bearing pin.

9. The aircraft-passenger seat as claimed in claim 1, wherein the damping device has a frictional-damper member present between a first articulation part of the articulation arrangement and a second articulation part of the articulation arrangement, and
wherein the frictional-damper member provides friction during a relative movement between the first articulation part and the second articulation part.

10. The aircraft-passenger seat as claimed in claim 1, wherein the damping device comprises a fluid-dynamic damper.

11. The aircraft-passenger seat as claimed in claim 1, wherein the damping device has an adjustment mechanism for adjusting a damping action provided by the damping device.

12. The aircraft-passenger seat as claimed in claim 1, wherein a first panel component of the table top has a second panel component connected to itthe first panel component in an articulated manner,
wherein the second panel component is mounted in an articulated manner on the first panel component, and
wherein a further damping device is provided for damping a pivoting movement of the second panel component relative to the first panel component.

13. A seat row comprising a number of aircraft-passenger seats according to claim 1 which are present one beside the other.

* * * * *